United States Patent [19]

DiSimone

[11] Patent Number: 4,700,385
[45] Date of Patent: Oct. 13, 1987

[54] REMOTE TELEPHONE CONTROL APPARATUS

[76] Inventor: Donald J. DiSimone, 19633 Fourteen Mile Rd., Fraser, Mich. 48026

[21] Appl. No.: 821,839

[22] Filed: Jan. 23, 1986

[51] Int. Cl.[4] .............................................. H04M 1/23
[52] U.S. Cl. ..................................... 379/448; 379/422
[58] Field of Search .................. 179/81 R, 84 R, 103, 179/178, 158 R, 159; 379/422, 442, 447, 448, 450, 424

[56] References Cited

U.S. PATENT DOCUMENTS

| | | | |
|---|---|---|---|
| 2,653,192 | 9/1953 | Shipton | 179/103 |
| 4,061,888 | 12/1977 | Rasmussen | 179/100 D |
| 4,075,426 | 2/1978 | Gould | 179/1 H |
| 4,079,196 | 3/1978 | Spanel | 179/1 HS |
| 4,362,905 | 12/1982 | Ismail | 179/178 |
| 4,379,953 | 4/1983 | Huff | 179/178 |
| 4,384,171 | 5/1983 | Klee | 179/84 C |
| 4,472,602 | 9/1984 | Bordelon et al. | 179/103 |
| 4,488,009 | 12/1984 | Sherman | 179/100 D |
| 4,533,792 | 8/1985 | Binks et al. | 179/84 C |
| 4,536,622 | 8/1985 | Rieman | 179/103 |

OTHER PUBLICATIONS

John L. Fike et al., Understanding Telephone Electronics, 1983, p. 4-3, FIG. 4-1.
Fordham Radio, Winter Special, Jan. 1985, p. 44, B-P Telephone Ring Controller, Model T-A-1342.

Primary Examiner—Gene Z. Rubinson
Assistant Examiner—C. Champion
Attorney, Agent, or Firm—Basile and Hanlon

[57] ABSTRACT

A control apparatus for remotely controlling the operation of a telephone hand set when a hand set is remotely located from its associated base. The apparatus includes a housing having first and second connectors mounted thereon. The connectors respectively receive mating plug and are insertable into the hand set connector to connect the housing between the hand set/receiver cord and the plug in connector in the telephone hand set. A switch is mounted on the housing and includes a switchable contact connected in the ringing circuit of the telephone network for opening and closing the circuit upon each depression of the switch. In another embodiment, the switch is mounted directly in the telephone hand set.

3 Claims, 3 Drawing Figures

REMOTE TELEPHONE CONTROL APPARATUS

BACKGROUND OF THE INVENTION

1. FIELD OF THE INVENTION:

The present invention relates, in general, to telephones, and, more specifically, to accessories for telephones which enable control of the telephone operation while the hand set is removed from the receiver.

2. DESCRIPTION OF THE PRIOR ART:

A conventional telephone includes a hand set having a microphone transmitting for sounds over the telephone network and a receiver for receiving sounds from the telephone network and converting the electrical signals into audible sounds. Such telephones also include a base which may be mounted on the wall or any horizontal surface. The base typically includes a hook switch which is depressed when the hand set is placed on the receiver thereby re-establishing the ringing or dial tone circuit to enable subsequent incoming calls to be received.

Other types of telephones, such as so-called trim-line or Princess type phones, have the dialing push buttons mounted directly in the hand set along with the microphone and receiver. This enables the telephone to be conveniently dialed after the hand set is removed from the base. However, it is sometimes desirable to locate the hand set a considerable distance from the base, particularly for use by invalids, etc. This creates a problem since the hook switch on the base must be depressed after each telephone call to re-establish the ringing or dial tone circuit. This requires that the hand set be replaced on the base and can pose a difficulty for one confined to a bed or unable to conveniently replace the hand set on the base after each telephone call.

To overcome these problems, various telephone control devices have been devised for re-establishing the dial tone circuit when the hand set is located remote from the base. U.S. Pat. Nos. 4,379,953 and 4,536,622 disclose telephones having switches or push buttons mounted directly on the hand set for controlling the on-line or off-line operation of the telephone and/or enables the dial tone circuit to be established when the hand set is remote from the base. U.S. Pat. No. 4,384,171 discloses a similar type of telephone accessory which includes a plug-in module which silences the telephone bell at pre-determined times during a 24 hour period.

While these attempts have been somewhat effective in to re-establishing the dial tone circuit when the hand set is away from the base, they require extensive modification to the telephone hand set itself thereby increasing the cost of the telephone or requiring that a new telephone having such a feature be purchased.

Thus, it would be desirable to provide a remote telephone control apparatus which overcomes the problems encountered with previously devised attempts to re-establish the dial tone or ringing circuit when the hand set of a telephone is away from the telephone base. It would also be desirable to provide a remote telephone control apparatus which can easily and quickly be attached to any conventional telephone having plug-in cord connectors.

SUMMARY OF THE INVENTION

The present invention is a remote telephone control apparatus which enables the dial tone circuit to be re-established when the hand set is located away from the telephone base without requiring the hand set to be replaced on the base after each call is completed.

The remote telephone control apparatus includes a housing having first and second connectors mounted at opposite ends. The first connector is adapted to receive the conventional plug attached to the end of the telephone cord connecting the hand set to the base. The second connector has a shape complimentary to the first connector and is engagable with the plug-in connector on the telephone hand set. A switch is mounted on the housing and includes a contact switchable between first and second positions and remains at each position until depressed a second time. The contact is wired in the ringing on dial tone circuit between the first and second connectors and re-establishes the dial tone without requiring the hand set to be re-emplaced on the receiver.

In use, the existing telephone cord is disconnected from the hand set of a telephone and the telephone control device is inserted therebetween through the first and second connectors. After a telephone call has been completed, the user can depress the switch thereby re-establishing the dial tone circuit so as to enable the telephone to receive subsequent calls without requiring the telephone hand set to be emplaced on the base. Upon receiving the next call, the switch is again depressed thereby opening the ringing circuit and enabling the call to be completed. Optionally, the switch may be retained in its open position thereby completely silencing the telephone.

In another embodiment, the switch is in the form of a slide switch and is mounted directly on the hand set adjacent to the dial push buttons. The connections for the switch are housed within the interior of the hand set and operate in the same manner as described above to open and close the ringing circuit. However, due to the stationary position of the switch in either its open or closed positions, it does not have to be constantly depressed to re-establish the ringing circuit.

The remote telephone control apparatus of the present invention overcomes many of the problems encountered with previous attempts to provide remote operation of a telephone hand set when it is located away from its associated base. The present invention is of simple construction and may be easily and quickly attached to any telephone having plug-in cord connections. This enables its use on any existing telephone without requiring a new telephone having similar features to be purchased.

BRIEF DESCRIPTION OF THE DRAWING

The various features, advantages and other uses of the present invention will become more apparent by referring to the following description and drawing in which.

DESCRIPTION OF THE PREFERRED EMBODIMENTS

Figure 1:
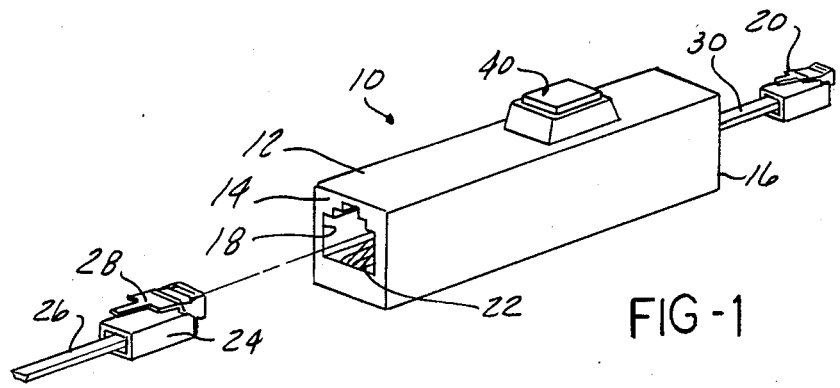
FIG. 1 is an exploded, perspective view of a preferred embodiment of the remote telephone control apparatus of the present invention.

Throughout the following description and drawing an identical reference number is used to refer to the same component shown in multiple figures of the drawing.

Figure 2:
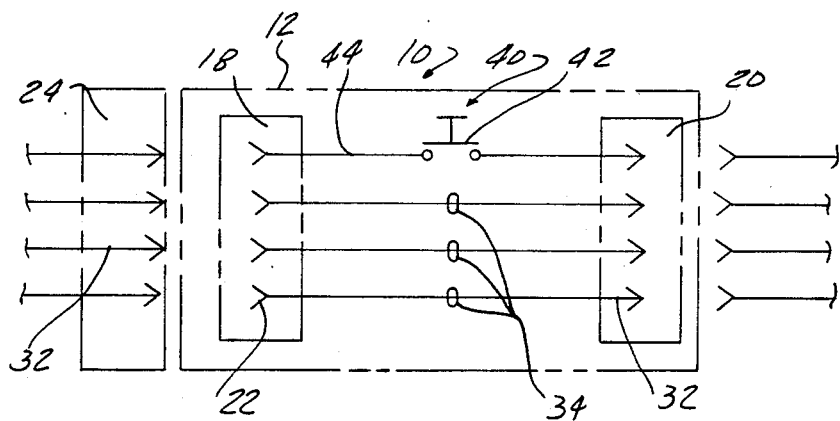
FIG. 2 is a schematic diagram showing the wiring connections in the remote telephone control apparatus.

As shown in FIGS. 1 and 2, a preferred embodiment of the present invention is a remote telephone control apparatus 10 which provides the capability for re-establishing or reconnecting the ringing or dial tone circuit of a telephone when a telephone hand set is located remote from its base.

The remote telephone control apparatus 10 includes a housing 12 having first and second ends 14 and 16, respectively. The housing 12 is hollow and formed of any suitable material, such as a lightweight plastic, etc.

The housing 12 is provided with first and second connectors 18 and 20, respectively. The first connector 18 is mounted in the first end 14 of the housing 12 and is a female type connector. Preferably, the first connector 18 is a conventional six-position, four contact connector used in standard plug-in telephones. The contacts 22 are mounted within the connector 18 which has a shape complimentary to the shape of a standard male connector 24 attached to the end of the telephone cord normally used to connect the hand set to the base. The connector 24 is removably insertable within the first connector 18 by means of a standard snap lock 28 mounted on the connector housing 24.

The second connector 20 has a shape identical that of the connector 24 and is connected by a multi-wire conductor 30 to the interior of the housing 12 as described in greater detail below. The second connector 20 is removably insertable within a correspondingly shaped female connector mounted within a standard telephone base, not shown.

As shown in FIG. 2, the contacts 22 of the first connector 18 are connected to the contacts 32 in the second connector 20 by means of wires 34 mounted within the housing 12. These wires 34 carry the conventional voice current signals.

As shown in both FIGS. 1 and 2, a switch means 40 is mounted on the housing 12 and extending partially therethrough into the interior of the housing 12. The switch assembly 40 is preferably a single pole, single throw type of switch having one switchable contact 42. The contact 42 is switchable between two positions; either open or closed. The contact 42 is wired into the ringing or dial tone conductor 44 and provides a means for making and breaking the ringing circuit of the telephone as described in greater detail hereafter. Furthermore, it should be noted that the switch means 40 maintains the contact 42 in either of the open or closed positions until depressed a second time.

In operation, the connector 24 attached to the end of telephone cord is disconnected from the telephone handset and the second connector 20 inserted into the correspondingly formed connector on the telephone hand set. The connector 24 is then inserted into the first connector 18 in the housing 12. Depression of the switch 40 will move the contact 42 into its closed position completing the ringing circuit through the conductor 44 thereby enabling a dial tone to be established when the telephone hand set is removed from the base. With the telephone hand set located away from the receiver and the telephone call completed, the switch 40 may be depressed which moves its contact 42 to the open position shown in FIG. 2. This breaks the ringing circuit which, upon subsequent depression of the switch means 40, re-establishes the dial tone for subsequent calls.

It should also be noted that the switch 40 may be maintained in its open state to prevent any incoming calls if so desired. In this manner, operation of the telephone hand set in a conventional manner may be maintained even though the hand set is located remote from its base. This eliminates the need for replacing the hand set on the base after each telephone call is completed, which is especially advantageous for invalids, people with physical disabilities, and others etc., which have limited mobility to reach the telephone.

Figure 3:
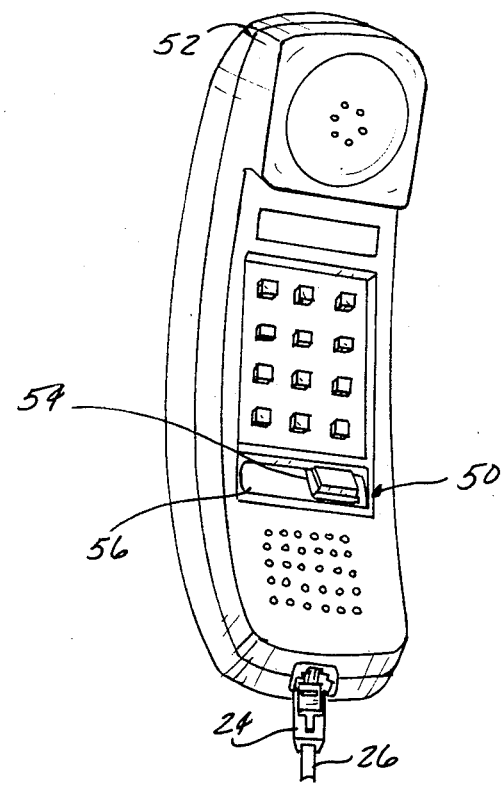
FIG. 3 is a perspective view of another embodiment of the remote telephone control apparatus of the present invention.

Referring now to FIG. 3, there is illustrated another embodiment of the remote telephone control apparatus of the present invention. In this embodiment, the remote telephone control apparatus 50 is mounted directly on a conventional telephone hand set 52, such as that used with Trim-line or Princess type telephones. The telephone control apparatus 50 shown in FIG. 3 includes a horizontally movable slide-type switch 54 which is mounted within a slot 56 formed in the bottom portion of the hand set 52. The switch 54 also has a switchable contact, similar to the contact 42 of the switch means 40 shown in FIG. 2, is connected in the same way in the ringing circuit to alternately make and break the ringing circuit in the same manner as described above. As before, the switch 54 remains in either position to retain its contact in the selected open or closed position.

In summary, there has been disclosed a unique remote telephone control apparatus which enables the telephone to be operated when the hand set is located remote from its base and does not require the hand set to be placed on the base to re-establish the dial or rining circuit. The remote telephone control apparatus of the present invention is inexpensive in construction and can be quickly and easily mounted on any existing telephone having plug-in connectors. This enables the remote telephone control apparatus of the present invention to be used on any existing plug-in type telephones without requiring modifications to the telephone itself or the purchase of a new telephone having such built in switch capabilities.

What is claimed is:

1. An apparatus for remote control of a telephone having a hand set and a base connected by a conductor by a pair of mating plug-in connectors and including at least a dial tone circuit comprising:
   a hollow housing;
   a first connector removably engageable with the plug-in connector on the telephone conductor from the hand set;
   a second connector removably insertable into the plug-in connector in the base;
   the housing being located in close proximity with the hand set; and
   switch means, mounted on the housing, for selectively opening and closing the dial tone circuit when the hand set is located remote and separate from the base, the switch means including a contact switchable between first and second positions;
   the contact being connected in the dial tone circuit for selectively opening and closing the dial tone circuit upon successive activation of the switch means.

2. The apparatus of claim 1 wherein the first and second connectors each contain four-wire contacts.

3. The apparatus of claim 1 wherein the switch means maintains the switchable contact in each of the first and second position upon each activation of the switch means.

* * * * *